United States Patent [19]
Grigo et al.

[11] Patent Number: 4,473,686
[45] Date of Patent: Sep. 25, 1984

[54] BLOCK COPOLYMERS

[75] Inventors: Ulrich Grigo, New Martinsville, W. Va.; Karl-Heinz Köhler; Rudolf Binsack, both of Krefeld, Fed. Rep. of Germany; Leo Morbitzer, Cologne, Fed. Rep. of Germany; Josef Merten, Korschenbroich, Fed. Rep. of Germany; Ludwig Bottenbruch, Krefeld, Fed. Rep. of Germany; Walter Heitz, Kirchhain, Fed. Rep. of Germany

[73] Assignee: Bayer Aktiengesellschaft, Leverkusen, Fed. Rep. of Germany

[21] Appl. No.: 500,007

[22] Filed: Jun. 1, 1983

Related U.S. Application Data

[63] Continuation-in-part of Ser. No. 346,749, Feb. 8, 1982, abandoned.

[30] Foreign Application Priority Data

Feb. 13, 1981 [DE] Fed. Rep. of Germany ....... 3105365

[51] Int. Cl.³ .......................... C08F 8/30; C08L 77/00
[52] U.S. Cl. .................................... 525/184; 525/382; 525/426; 525/911
[58] Field of Search ................ 525/911, 184, 382, 426

[56] References Cited

U.S. PATENT DOCUMENTS 4,018,731  5/1977  Sims ..................................... 525/184

FOREIGN PATENT DOCUMENTS 1169737  11/1969  United Kingdom ................ 525/184

Primary Examiner—Wilbert J. Briggs
Assistant Examiner—A. L. Carrillo
Attorney, Agent, or Firm—Connolly and Hutz

[57] ABSTRACT

A block copolymer is produced from
I. 1 to 60% by weight of at least one telechelic diene polymer containing terminal carbonate ester, —OH—, —NH₂—, carboxylic acid or carboxylic acid ester groups and having a molecular weight $M_n$ of from about 400 to 1300, and
II. 99 to 40% by weight of at least one polyamide or polyamide-forming component.

5 Claims, No Drawings

BLOCK COPOLYMERS

This application is a continuation-in-part application of my application Ser. No. 346,749, filed Feb. 8, 1982 now abandoned.

This invention relates to block copolymers of linear poly-1,3-diene blocks and polyamide blocks.

Polyarmides are important in the manufacture of fibres and mouldings by vitue of their valuable mechanical properties, such as for example their rigidity, toughness, resistance to stress corrosion and resistance to solvents.

However, thermoplastic polyamides show relatively little reversible elasticity which seriously restricts their use in fields where high elasticity is required.

Attempts have already been made to improve the elastic properties of polyamides by the addition of polybutadiene or graft products based on polybutadiene.

Thus, in the German Offenlegungsschrift No. 2,742,176 elastomer-modified polyamides produced by compounding thermoplastic polyamides and graft products of polybutadiene (graft base) and (meth)-acrylates and/or styrene/acrylonitrile mixtures (graft monomers) are described. Although these polyamides show high notched impact strength, their reversible elongation is not sufficient for every field of application.

According to U.S. Pat. No. 3,859,382, the flexibility of polyamides at low temperatures is improved by the co-condensation of elastomeric polymer blocks containing terminal isocyanate groups. According to the tests reported in detail in this U.S. patent specification, the degree of improvement in the elastic properties decreases with increasing molecular weight of the polyamide blocks and the molecular weight of the elastomeric polymer blocks has no influence on the improvement of these properties. This clearly applies to the incoporation of elastomeric polymer blocks having molecular weights in the range of from 10,000 to 100,000, of the type used in the above-mentioned U.S. patent specification.

It has now surprisingly been found that the molecular weight of the elastomer component has a considerably influence on the improvement in the elastic properties of polyamide block copolymers because a much more considerably improvement in the elastic properties, particular in the reversible elongation, of polyamides can be achieved by cocondensation of relatively short-chain polydiene blocks than by the incorporation of polydiene blocks having molecular weights of at least 10,000.

Accordingly, the present invention relates to block copolymers produced from

I. 1 to 60% by weight, preferably 5 to 45% by weight, of telechelic diene polymers containing terminal carbonate ester groups, —OH—groups, —NH$_2$—groups, carboxylic acid ester or carboxylic acid groups and having a molecular weight (number average) Mn of from about 400 to 1,300, preferably from 450 to 1,000, and II. 99 to 40% by weight, preferably 95 to 55% by weight, of polyamides or polyamide-forming components. The polydienes used in accordance with the invention are preferably linear compounds containing two terminal reactive groups and corresponding to the following general formula

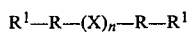

in which

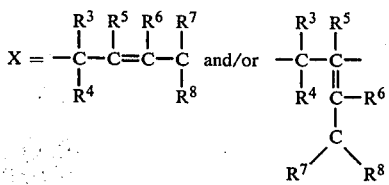

where
R$^3$ to R$^8$, each independently, =C$_1$–C$_4$-alkyl, H or halogen, n about 6–90; R=a single bond or an alkylidene group containing from 1 to 3 C-atoms, such as —CH$_2$—,

or —C(CH$_3$)$_2$—; and R$^1$=—OCOOR$^2$, —COOR$^2$, —OH or —NH$_2$
where R$^2$=hydrogen, C$_1$–C$_{10}$-alkyl or C$_5$–C$_{10}$-cycloalkyl.

They may be produced from optionally substituted 1,3-dienes, such as for example butadiene, isoprene, dimethyl butadiene and chloroprene, and radical initiators such as, for example, dialkyl peroxy dicarbonates or azodicarboxylic acid esters, preferably by bulk polymerisation, for example by the methods described in German Offenlegungsschrift Nos. 2,900,880 and 2,908,298. Polydienes containing terminal hydroxy groups may be produced from the resulting polydienes containing terminal carbonate ester groups by hydrolysis or from polydienes containing terminal carboxylic acid ester groups by reduction of the ester group.

In the poly-1,3-dienes used in accordance with the invention, the diene units are attached to one another through 1,2- and/or 1,4-bonds. It is preferred to use poly-1,3-dienes in which at least 50 mole percent and preferably 70 mole percent of the monomer units are attached to one another through 1,4-bonds.

The polydienes used in accordance with the invention have a molecular weight (number average of the molecular weight) $\overline{M}_n$ of 400 to 1,300 and preferably from 450 to 1,000.

Preferred polydienes consist of recurring units of butadiene, isoprene, dimethyl butadiene and/or chloroprene. Particularly preferred polydienes consist of butadiene and isoprene.

The polyamide component may be produced from lactams containing from 4 to 12 C-atoms in the ring or from corresponding ω-amino acid such as, for example, caprolactam, undecane lactam, dodecane lactam, 11-aminoundecanoic acid or 12-aminododecanoic acid.

The polyamide component may also be a condensation product of an aliphatic, alicyclic or aromatic dicarboxylic acid containing from 2 to 12 C-atoms such as, for example, succinic, adipic, suberic, azelaic, sebacic, di-undecanoic, di-dodecanoic acid, terephthalic acid, isophthalic acid or cyclohexane dicarboxylic acid, with an aliphatic, alicyclic or aromatic diamine containing from 2 to 12 C-atoms such as, for example, hexamethylene diamine, m- and/or p-xylylene diamine, 2,2,4-trimethyl hexamethylene diamine, isophorone diamine or bis-4-aminocyclohexylmethane.

Of these polyamides, polyamides of adipic acid or azelaic acid and hexamethylene diamine or bis-(4-aminocyclohexyl)-methane and/or ecaprolactam and/or lauric lactam are particularly suitable.

The molecular weight $M_n$ of the polyamide component should preferably be in the range of from 500 to 10,000.

The block copolymers according to the invention may be formed on the one hand by condensing the polyamide-forming starting compounds in the usual way in the presence of the telechelic polymers. In this connection, a reaction in stages has proved to be particularly advantageous. In the first stage of this reaction, a poly-1,3-diene containing terminal ester groups or terminal hydroxyl groups is reacted with an excess of diamine or dicarboxylic acid in a nitrogen atmosphere at temperatures in the range of from 180°to 250° C. The actual polycondensation reaction is carried out in a second stage at temperatures in the range of from 220° C. to 310° C. after the addition of more polyamide-forming monomer. The reaction as a whole should be carried out in such a way that as high a final viscosity as possible is obtained without any cross-linking or gelation occuring. In addition, to obtain products having a relatively high final viscosity, it is best to maintain an exact equimolar ratio between the terminal carboxyl and amino groups.

On the other hand, the condensation reaction leading to the elastomeric copolymers according to the invention may also be carried out by first preparing in a preliminary reaction a polyamide block polymer containing terminal carboxyl groups which, in a second step, is reacted with a polydiene containing either terminal amino groups or terminal —OH—groups. Where a polydiene of this type is used, it is best to carry out formation of the block polymer under polyester conditions, i.e. in vacuo and optionally in the presence of a catalyst such as titanium tetra-isopropylate for example. Polyamide blocks containing terminal carboxyl groups are obtained by polycondensation with an excess of dicarboxylic acid. Depending on the size of the excess used, it is possible additionally to vary the length of the macromolecular chain and hence the average molecular weight.

The block copolymers according to the invention should preferably have a relative viscosity of from about 1.8 to 4.0, more preferably from 1.0 to 3.5, as measured in m-cresol at 23° C.

The outstanding property of the block copolymers according to the invention is their relatively high reversible elongation, as may be determined by a suitably designed tensile test according to DIN 53 455. In this test, the test specimen is stretched by a certain amount under an appropriate load. After the load has been removed, the residual elongation is measured. The difference between elongation under load and elongation after removal of the load is the reversible elongation. Accordingly, relative elongation may be calculated in accordance with the following equation:

$$\text{relative reversible elongation} = \frac{\text{(elongation under load) minus (elongation after removal of load)}}{\text{elongation under load}} \cdot 100$$

Accordingly, the higher the reversible elongation, the greater the extent to which a deformed body is able to return to its original form.

This property enables the block copolymers according to the invention to be used in particular for the production of for example bumpers, fenders or coach-work parts.

In addition, the block copolymers according to the invention show at least the same toughness as the unmodified polyamides. Usually the impact strength of the block copolymers has been increased versus the unmodified polyamides.

The block copolymers according to the invention may be modified in the usual way. Accordingly, they may contain, for example, reinforcing materials and fillers, particularly glass fibres, flame protective agents, stabilisers, nucleating agents, lubricants and mould release agents as well as dyes and pigments.

The reinforcing materials and fillers, which are used for increasing rigidity and strength, are employed in standard amounts of from 5 to 40% by weight, based on the sum of additive and block copolymers. Examples of suitable reinforcing materials and fillers are glass fibres, kaolin, quartz, mica, wollastonite, talcum, titanium dioxide and aluminium oxide. Glass fibres are preferred.

(A) Preparation of poly-1,3-diene dicarboxylic acid dimethyl ester ($\alpha$) Preparation of the polybutadiene dicarboxylic acid dimethyl ester used in Examples 1 to 6 and in Comparison Examples II and III is carried out by the bulk polymerisation of butadiene, for which purpose 325 g of 1,3-butadiene are added under nitrogen to quantities of 55 g, 39 g, 21 g and 7 g of azo-bis-isobutyric acid methyl ester. The reaction mixture is stirred for 14 to 16 hours at 80° C., the polymerisation reaction taking place under the natural pressure of the system (around 12 bars). Thereafter the excess butadiene is distilled off. Residual butadiene and tetramethyl succinic acid dimethyl ester, formed as a secondary product, are removed over a period of 6 hours at 0.1 mbar in a rotary evaporator (bath temperature 90° C.), leaving 174 g, 140 g, 95 g and 40 g, respectively, of a crystal-clear liquid having an $M_n$ of 800 (as determined by vapour pressure osmosis) and containing 78 mole percent of 1,4-bonds; $M_n$ 1000 and containing 79 mole percent of 1,4-bonds; $M_n$ 1300 and containing 80 mole percent of 1,4-bonds; $M_n$ 6000 and containing 82 mole percent of 1,4-bonds.

($\beta$) As in the preparation of polybutadiene dicarboxylic acid dimethyl esters, a polyisoprene dicarboxylic acid dimethyl ester having an $M_n$ of 1000 was prepared by reacting 22 g of azo-bis-isobutyric acid methyl ester and 325 g of isoprene.

(B) Preparation of polybutadiene containing terminal OH-groups.

Preparation of the hydroxyl-terminated polybutadienes used in Examples 7 to 11 is carried out by the bulk polymerisation of butadiene, for which purpose 130 g of butadiene are added under nitrogen to a solution of 7.47 g of diethyl peroxydicarbonate in 50 ml of hexane. The reaction mixture is stirred for 4 hours at 65° C. and then for 2 hours at 80° C. Thereafter, the excess butadiene is distilled off. Residual butadiene and any low molecular weight secondary products formed by secondary reactions are removed over a period of 6 hours at 0.1 mbar in a rotary evaporator (bath temperature 90° C.), leaving 26.1 g of a crystal-clear product having an $M_n$ of 800. The terminal carbonate groups are converted into hydroxyl groups by alkaline hydrolysis.

EXAMPLES 1 and (2)

The following reaction components are reacted under nitrogen for 4 hours at 220° C. in a stirrer-equipped reaction vessel provided with a distillation column:

10 (20) g [10 (20) m moles] of polybutadiene[1] ($M_n = 1000$)

4.6 (9.3) g [40 (80) m moles] of hexamethylene diamine,

Thereafter, 4.4 (8.8) g [30 (60) moles] of adipic acid, 81.9 (72.8) g (0.64) m moles) of β-caprolactam and 9.4 (8.3) g [72 (63) m moles] of aminocapric acid are added, followed by stirring for 1 hour at 220° C. and then for 5 hours at 270° C.

[1] = containing terminal isobutyric acid methyl ester groups.

A white, slightly clouded, highly viscous melt is formed.

The melt is cooled, granulated and extracted with methylene chloride for 4 hours to remove the unreacted ε-caprolactam.

EXAMPLE 3

The following reaction components are reacted under nitrogen for 2 hours at 270° C. in a stirrer-equipped reaction vessel provided with a distillation column:

20 g (25 m moles) of polybutadiene[1] ($M_n = 800$)

11.7 g (55 m moles of bis-(4-aminocyclohexyl)-methane.

Thereafter, 4.4 g (30 m moles) of adipic acid, 85.9 g (0.33 moles) of AH-salt and 3.8 g (Δ 10% excess) of hexamethylene diamine are added, followed by stirring for 15 minutes at 270° C. and then for 2 hours at 290° C.

[1] = containing terminal isobutyric acid methyl ester groups.

A white viscous melt is formed.

EXAMPLE 4

The following reaction components are reacted under nitrogen for 4 hours at 220° C. in a stirrer-equipped reaction vessel provided with a distillation column:

130.0 g (100 m moles) of polybutadiene[1] ($M_n = 1300$)

41.6 g (358 m moles) of hexamethylene diamine.

[1] = containing terminal isobutyric acid methyl ester groups.

A pale yellow, thinly liquid oil is formed.

Thereafter, 76.2 g (118.8 m moles) of the diamine-modified polybutadiene, 11.44 g (118.8 m moles) of azelaic acid, and 272.1 g (0.9 mole) of azelaic acid hexamethylene diamine salt are stirred under nitrogen for 1 hour at 200° C. and for 2 hours at 250° C. in a 250 ml-capacity spherical flask.

A pale yellow, slightly clouded, highly viscous melt is formed.

EXAMPLES 5 and 6

These elastomeric block copolymers are prepared as in Examples 1 and 2 using a polyisoprene as the elastomeric component ($M_n = 1000$).

EXAMPLES 7 and 8

In a stirrer-equipped reaction vessel provided with a distillation column, 90 g (80 g) [71.4 (63.5) m moles] of polyamide ($M_n = 2500$), 10 g (20 g) [20 (40) m moles] of poly-1,3-butadiene containing terminal OH-groups, 2.3 g (1.06) [51.4 (23.5) m moles] of 1,4-butane diol and 5 ml of a 1% titanium tetraisopropylate solution in isopropanol are stirred under nitrogen for two hours at 220° C. and for one hour at 230° C. in a vacuum of less than 1 Torr.

EXAMPLE 9

The procedure is as in Example 7, except that 40 m moles of polyisoprene containing terminal OH-groups and having a molecular weight of 1000 are used instead of 40 m moles of polybutadiene.

EXAMPLE 10

70 g (55.5 m moles) of polyamide ($M_n = 2500$), 36 g (60 m moles) of polyisoprene containing terminal OH-groups ($M_n = 1000$), 0.33 g (4.5 m moles) of adipic acid, and 5 ml of a titanium tetraisopropylate solution in isopropanol (1% concentration) are stirred under the same reaction conditions as in Example 7.

EXAMPLE 11

60 g (47.6 m moles) of polyamide ($M_n = 2500$), 49 g (80 m moles) of poyisoprene containing terminal OH-groups ($M_n = 1000$), 1.37 g (32.4 m moles) of adipic acid, and 5 ml of a titanium tetraisopropylate solution in isopropanol (1% concentration) are stirred under the same reaction conditions as in Example 7.

COMPARISON EXAMPLE I 80 parts of polyamide-6 ($\eta$rel = 3.02) are mixed with a polybutadiene having an $M_n$ of ≈70,000 (88% of 1,4-bonds) in a Werner and Pfleiderer ZSK 32 continuous twin-screw extruder. The barrel temperature is adjusted in such a way that a melt temperature of 280° C. is guaranteed. The melt strand was cooled in water, granulated and dried.

COMPARISON EXAMPLE II

The following reaction components were reacted under nitrogen for 4 hours at 220° C. in a stirrer-equipped reaction vessel provided with a distillation column:

20 g (67 m moles) of polybutadiene having a molecular weight of 300 and containing terminal isobutyric acid methyl ester groups, and 11.6 g (100 m moles) of hexamethylene diamine.

Thereafter, 6.9 g (33 m moles) of adipic acid, 72.8 g (0.62 m mole) of ε-caprolactam, and 8.3 g (63 m moles) of aminocaproic acid are added, followed by stirring for 1 hour at 220° C. and then for 5 hours at 270° C. A slightly clouded, highly viscous melt is formed.

The melt is cooled, granulated and extracted with methylene chloride for 4 hours to remove the unreacted ε-caprolactam.

COMPARISON EXAMPLE III 20 g (3.3 moles) of polybutadiene ($M_n = 6000$) containing isobutyric acid methyl ester groups are reacted with
1.16 g (10 m moles) of hexamethylene diamine
in the same apparatus and under the same reaction conditions as in Comparison Example II. Thereafter,
0.98 g (6.7 m moles) of adipic acid,
72.8 g (0.64 m moles) of ε-caprolactam, and
8.3 g (63 m moles) of aminocaproic acid
are added, followed by stirring for 1 hour at 220° C. and then for 5 hours at 270° C.

A white highly viscous melt is formed.

The melt is cooled, granulated and extracted with methylene chloride for 4 hours to remove the unreacted ε-caprolactam.

Standard small test bars (according to DIN 53 453) and tensile test bars (according to DIN 53 455) are injection-moulded from the polymers described in the Examples at 260° C. using a standard injection-moulding machine. The standard small test bars were used for measuring impact strength at room temperature (in accordance with DIN 53 453) whilst the tensile test bars were used for measuring relative reversible elongation (in accordance with DIN 53 455).

The composition and properties of the block copolymers are set out in Tables 1 and 2.

TABLE 1

Elastomeric block polyamides containing poly-1,3-diene blocks

| Example No. | Polyamide Type | Parts by weight | Poly-1,3-diene Parts by weight | Mn | Monomer | $\eta_{rel.}$[2] | Relative reversible elongation % | Impact strength KJ/m² | M.p.[3] (°C.) |
|---|---|---|---|---|---|---|---|---|---|
| 1 | PA-6 | 90[1] | 10 | 1000 | butadiene | 2.7 | 25 | unbroken | 218 |
| 2 | PA-6 | 80[1] | 20 | 1000 | " | 2.2 | 31 | " | 208 |
| 3 | PA-66 | 80 | 20 | 800 | " | 2.1 | 27 | " | 251 |
| 4 | PA-69 | 80 | 20 | 1300 | " | 2.3 | 38 | " | 212 |
| 5 | PA-6 | 90[1] | 10 | 1000 | isoprene | 2.7 | 26 | " | 219 |
| 6 | PA-6 | 80[1] | 20 | 1000 | " | 2.4 | 30.5 | " | 210 |
|  | PA-6 | 100 | — |  |  | 2.91 | 17 | " | 223 |
|  | PA-66 | 100 | — |  |  | 3.00 | 15 | " | 262 |
|  | PA-69 | 100 | — |  |  | 3.2 | 21 | " | 217 |
| I | PA-6 | 80 | 20 | 70000 | butadiene | cannot be measured | 18 | " | 221 |
| II | PA-6 | 80 | 20 | 300 | " | 3.1 | 20 | 38 | 209 |
| III | PA-6 | 80 | 20 | 6000 | " | 2.9 | 19 | unbroken | 219 |

[1]Based on the mixture; the actual PA-content of the block copolymer is somewhat lower because a fraction of the ε-caprolactam does not react and is subsequently extracted
[2]as measured in m-cresol at 23° C.
[3]Maximum of the main melting temperature as measured by the DSC-method after the 2nd heating

TABLE 2

Elastomeric block polyamides containing poly-1,3-diene blocks

| Example No. | Polyamide Type | % by weight | Monomer | Poly-1,3-diene Mn | % by weight | $\eta_{rel}$[2] | Rel. reversible elongation % | Impact strength $a_n$ KJ/m² | M.p. (°C.) |
|---|---|---|---|---|---|---|---|---|---|
| 7 | PA-6 | 90[1] | butadiene | 1000 | 10 | 3.02 | 27 | unbroken | 221 |
| 8 | PA-6 | 80 | " | 1000 | 20 | 3.74 | 34 | " | 220 |
| 9 | PA-6 | 80 | isoprene | 1000 | 20 | 2.75 | 36 | " | 220 |
| 10 | PA-6 | 70 | " | 1000 | 30 | 2.62 | 45 | " | 212 |
| 11 | PA-6 | 60 | " | 1000 | 40 | 2.41 | 50 | " | 207 |

[1]Based on the mixture; the actual content is slightly lower
[2]As measured in m-cresol at 23° C.

We claim:

1. A block copolymer produced by reacting two components consisting essentially of
   I. 1 to 60% by weight of at least one telechelic diene polymer containing terminal carbonate ester, —OH—, —NH₂—, carboxylic acid or carboxylic acid ester groups and having a molecular weight $M_n$ of from about 450 to 1000, and
   II. 99 to 40% by weight of at least one polyamide or polyamide-forming component.

2. A block copolymer as claimed in claim 1, prepared from
   I. 5 to 45% by weight of the diene polymer, and
   II. 95 to 55% by weight of the polyamide or polyamide forming components.

3. A block copolymer as claimed in claim 1, wherein the diene polymer is a linear compound containing two terminal reactive groups and corresponding to the following general formula $$R^1-R-(X)_n-R-R^1$$

in which

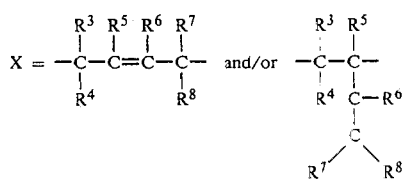

where
$R^3$ to $R^8$, each independently, $=C_1-C_4$-alkyl, H or halogen; n=about 6-90; R=a single bond or an alkylidene group containing from 1 to 3 C-atoms; and $R^1=$—COOR², —OH, —NH₂, —OCOOR² where $R^2=$hydrogen, a $C_1-C_{10}$-alkyl or a $C_5-C_{10}$-cycloalkyl group.

4. A block copolymer as claimed in claim 1 containing 5 to 40% by weight, based on the total sum of all components, of fillers and/or reinforcing materials.

5. A moulded product produced from a block copolymer as claimed in claim 1.

* * * * *